United States Patent
Tariq

(10) Patent No.: US 12,118,445 B1
(45) Date of Patent: Oct. 15, 2024

(54) TEMPORAL-BASED DEFORMABLE KERNELS

(71) Applicant: Zoox, Inc., Foster City, CA (US)

(72) Inventor: Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 1210 days.

(21) Appl. No.: 16/219,713

(22) Filed: Dec. 13, 2018

(51) Int. Cl.
  *G06K 9/62* (2022.01)
  *B60K 31/00* (2006.01)
  (Continued)

(52) U.S. Cl.
  CPC ......... *G06N 20/10* (2019.01); *B60K 31/0008* (2013.01); *G06N 3/084* (2013.01); *G06T 7/20* (2013.01); *G06T 7/254* (2017.01); *G06T 7/70* (2017.01); *G06V 10/243* (2022.01); *G06V 10/36* (2022.01); *G06V 10/44* (2022.01); *G06V 10/454* (2022.01); *G06V 10/70* (2022.01); *G06V 10/755* (2022.01); *B60K 2031/0016* (2013.01); *G06T 2207/20081* (2013.01); *G06T 2207/20084* (2013.01)

(58) Field of Classification Search
  CPC .... G06K 9/6217; G06K 9/6232; G06V 10/24; G06V 10/243; G06V 10/36; G06V 10/44; G06V 10/443; G06V 10/451; G06V 10/454; G06V 10/70; G06V 10/72; G06V 10/755; G06V 10/757; G06V 10/82; G06V 2201/07; G06V 2201/08; G06T 3/0087; G06T 7/20; G06T 7/207; G06T 7/254; G06T 7/30; G06T 7/38; G06T 7/70; G06T 2207/10016; G06T 2207/20081; G06T 2207/20084; G06T 2207/30242; G06T 2207/30261; G06N 3/084; G06N 20/10; B60K 31/0008; B60K 2031/0016
  USPC ................ 382/100, 103, 104, 107, 115, 128, 382/153–159, 181, 190, 195, 199, 382/203–205, 209, 210, 215–220, 224, 382/236, 276, 279, 282, 283, 291; 348/113, 118, 119, 148, 149, 169–172; 701/1–3, 22, 23, 27, 28, 41, 44, 70, 75, 701/77, 93, 98; 706/14, 15, 22, 25, 26
  See application file for complete search history.

(56) References Cited

U.S. PATENT DOCUMENTS 11,010,638 B2 * 5/2021 Gupta .................... G06V 10/82
2018/0012082 A1 * 1/2018 Satazoda .............. G06K 9/6267
(Continued)

OTHER PUBLICATIONS

Yue Zhao, Yuangjun Xiong, Dahua Lin, "Trajectory Convolution for Action Recognition", 32nd Conference on Neural Information Processing Systems, Dec. 3, 2018, pp. 1-12 (Year: 2018).*

(Continued)

*Primary Examiner* — Eric Rush
(74) *Attorney, Agent, or Firm* — Lee & Hayes, P.C.

(57) ABSTRACT

Techniques are disclosed for implementing a convolutional neural network that determines an offset field for deforming a kernel to be used in a convolution. The offset field is temporally-based, at least in part, on data generated at an earlier time. Furthermore, techniques are disclosed for using sensor data to train a neural network to learn shapes or configurations of such deformed kernels. The temporal-based deformable convolutions may be used for object identification, object matching, object classification, segmentation, and/or object tracking, in various examples.

21 Claims, 7 Drawing Sheets

(51) Int. Cl.
　　　*G06N 3/084*　　(2023.01)
　　　*G06N 20/10*　　(2019.01)
　　　*G06T 7/20*　　　(2017.01)
　　　*G06T 7/254*　　(2017.01)
　　　*G06T 7/70*　　　(2017.01)
　　　*G06V 10/24*　　(2022.01)
　　　*G06V 10/36*　　(2022.01)
　　　*G06V 10/44*　　(2022.01)
　　　*G06V 10/70*　　(2022.01)
　　　*G06V 10/75*　　(2022.01)

(56) References Cited

U.S. PATENT DOCUMENTS

2018/0373980 A1* 12/2018 Huval .................. G06K 9/6254
2020/0151457 A1*  5/2020 Sharma ................ G06K 9/6267
2021/0056351 A1*  2/2021 Peng ................... G06V 10/751

OTHER PUBLICATIONS

Mo Shan and Nikolay Atanasov, "A spatiotemporal model with visual attention for video classification", arXiv, arXiv:1707.02069v2, Jul. 2017, pp. 1-5 (Year: 2017).*

Guojiang Shen, Chaohuan Chen, Qihong Pan, Si Shen, and Zhi Liu, "Research on Traffic Speed Prediction by Temporal Clustering Analysis and Convolutional Neural Network With Deformable Kernels (May 2018)", IEEE Access, vol. 6, Oct. 2018, pp. 51756-51765 (Year: 2018).*

Yi Zhu, Zhenzhong Lan, Shawn Newsam, and Alexander Hauptmann, "Hidden Two-Stream Convolutional Networks for Action Recognition", arXiv, arXiv:1704.00389v4, Oct. 2018, pp. 1-16 (Year: 2018).*

Heng Wang, Alexander Klaser, Cordelia Schmid and Cheng-Lin Liu, "Action Recognition by Dense Trajectories", IEEE, Conference on Computer Vision and Pattern Recognition (CVPR), 2011, pp. 3169-3176 (Year: 2011).*

Jifeng Dai, Haozhi Qi, Yuwen Xiong, Yi Li, Guodong Zhang, Han Hu, Yichen Wei, "Deformable Convolutional Networks", IEEE, 2017 IEEE International Conference on Computer Vision (ICCV), 2017, pp. 764-773 (Year: 2017).*

Yunho Jeon and Junmo Kim, "Active Convolution: Learning the Shape of Convolution for Image Classification," IEEE Conference on Computer Vision and Pattern Recognition, 2017, pp. 1846-1854 (Year: 2017).*

Jian Zhu, Leyuan Fang and Pedram Ghamisi, "Deformable Convolutional Neural Networks for Hyperspectral Image Classification," IEEE Geoscience and Remote Sensing Letters, vol. 15, No. 8, Aug. 2018, pp. 1254-1258 (Year: 2018).*

Zhikang Zou, Xinxing Su, Xiaoye Qu and Pan Zhou, "DA-Net: Learning the Fine-Grained Density Distribution With Deformation Aggregation Network," IEEE Access, vol. 6, Nov. 2018, pp. 60745-60756 (Year: 2018).*

Zhao et al., "Trajectory Convolution for Action Recognition", in the Proceedings of the 32nd Conference on Neural Information Processing Systems, Dec. 2018, 12 pages.

Dai et al., "Deformable Convolutional Networks", available at <<https://arxiv.org/pdf/1703.06211.pdf>>, Mar. 2017, 12 pages.

Novotny et al., "Semi-convolutional Operators for Instance Segmentation", In the Proceedings of the European Conference on Computer Vision, Sep. 2018, 17 pages.

* cited by examiner

TEMPORAL-BASED DEFORMABLE KERNELS

BACKGROUND

Various methods, apparatuses, and systems utilize image data from image sensors. For example, robotic platforms (e.g., autonomous vehicles) may use image data and/or other sensor data to track objects, for example, to navigate through environments including obstacles, such as other vehicles, buildings, pedestrians, etc. Equipping a computer with such functionality may include building software components that take an image, identify salient portions of the image, and represent the salient portions to the computer in a form that the computer can use to conduct further operations. One form of software that can be built to equip a computer with such functionality are machine-learned (ML) models. However, previous attempts to train ML models to identify salient portions of an image have resulted in flawed or inaccurate ML models.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
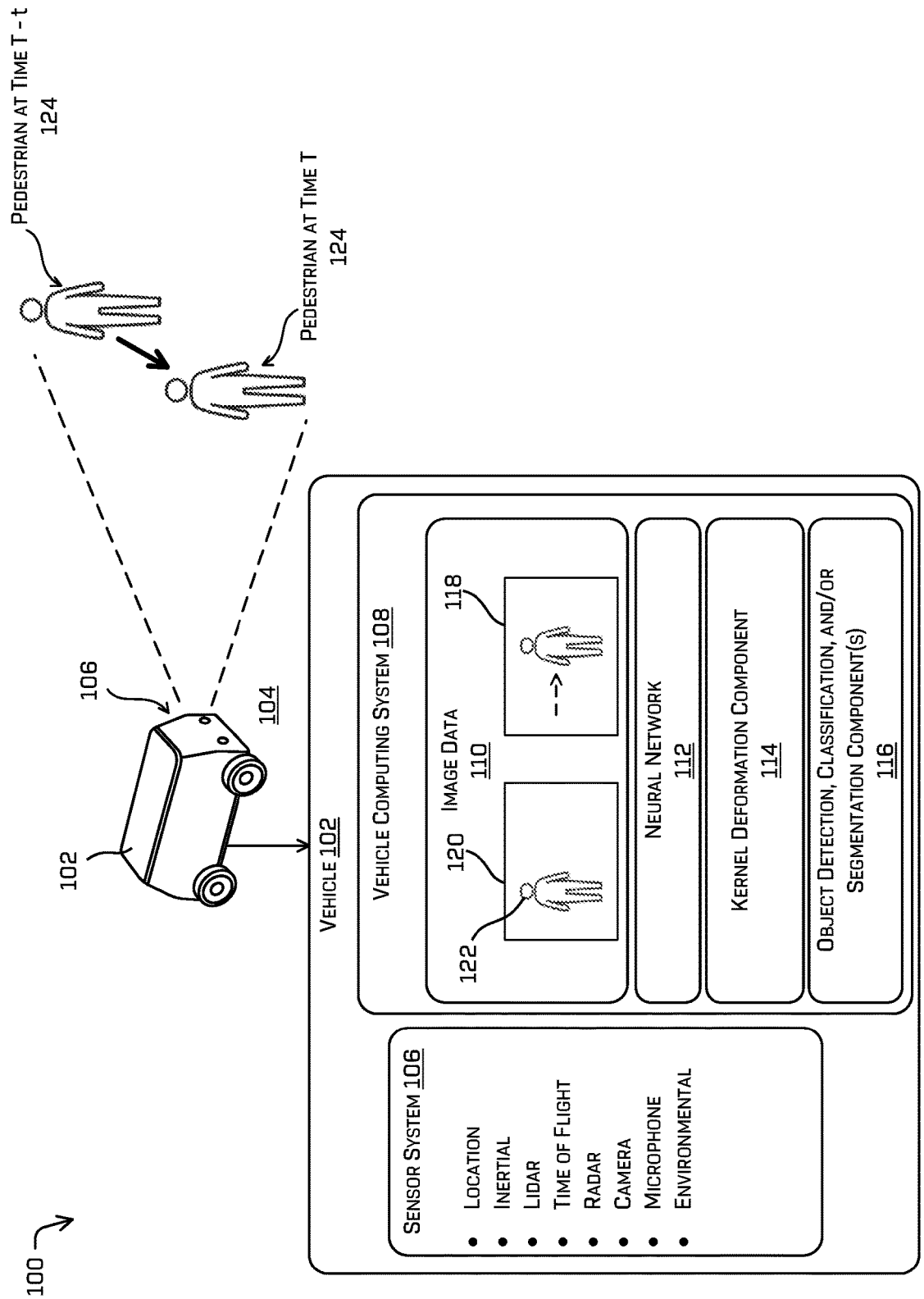
FIG. 1 illustrates an example environment that includes a vehicle having a neural network that identifies and/or matches objects based on time-based deformable convolutions, as described herein.

This disclosure is directed to techniques for implementing temporal-based deformable convolution(s) in a neural network based on optical flow or tracking information. For example, the techniques can be implemented in a neural network that outputs feature maps produced in part by a convolution kernel (hereinafter, "kernel") that is deformed in response to image content of present and earlier images (or feature map(s) thereof). Furthermore, this disclosure is directed to techniques for using various types of data, such as images, to train a neural network to learn shapes of deformed kernels. Such techniques may be used for object identification, matching, segmentation, and/or tracking.

Techniques discussed herein improve various applications of computer vision by increasing the accuracy of object detection, classification, segmentation, and the like, in addition to decreasing compute time for obtaining object identifications so that objects may be detected in real time for use in applications such as autonomous vehicle control, for example. In some cases, such techniques may allow for an improvement of instance segmentation, which is a pixel-level partitioning (e.g., segmentation) of an entity such as an object in an image in addition to providing an object identification to differentiate between multiple objects of the same type. The techniques discussed herein may also be considered for any of a number of other applications that involve a convolution operation, such as, for example, video games, augmented reality, general machine vision, etc.

The techniques discussed herein may include providing one or more images to a machine learning (ML) model and receiving, from the ML model, any of a number of possible results, such as classifications and/or identifications for one or more objects in an image, detection, and segmentation, just to name a few examples.

In various embodiments, one or more sensors (e.g., one or more image sensors, one or more lidar sensors, one or more radar sensors, and/or one or more time-of-flight sensors, etc.) of a vehicle (e.g., an autonomous vehicle) may capture images or data of objects. A computing system of the vehicle may receive image data from the image sensors and input at least a portion of the image data (e.g., image patches) into a neural network. The neural network may be trained to learn shapes, via an offset field, of deformed kernels conditioned on input features of a current image and one or more past images. Convolutional operations on the image data are then performed using such deformed kernels. Kernels that are deformed have an irregular shape or configuration. For example, elements of a deformed kernel are not arranged in a rectangular or square configuration. Instead, some of the elements may be shifted horizontally, vertically, or diagonally away from their respective positions in an array. Thus, an irregular shaped kernel describes a kernel having elements that are arranged in a shape other than a square or rectangle (or other than a default or initial shape).

According to some embodiments, the computing system of the vehicle may determine, based at least in part on output from the neural network, an identity of one or more objects (e.g., a unique identifier for a particular object), a detection and/or classification of one or more objects, segmentation information, and so on. Additionally, or alternatively, the computing system may determine, based at least in part on output from the neural network, whether an object matches another object.

Further, a computing system of the vehicle can receive such detection information, classification information, segmentation information, etc., and can use such information to generate a trajectory to control the vehicle. For example, the operations can generate segmentation information that identifies a drivable region of an environment and a non-drivable region of an environment, after which, a trajectory can be generated within such a drivable region. In another example, an object can be detected and classified to determine that there is a pedestrian in the environment, and a trajectory for a vehicle can be generate at least in response to such a detection and classification (e.g., to maintain a safe distance between the vehicle and the pedestrian). Other examples are discussed throughout this disclosure.

The techniques discussed herein can improve a functioning of a computing device in a number of ways. For example, the techniques discussed herein may include training a neural network to learn shapes of deformed kernels, which may allow a computing device to increase an accuracy and/or precision of detection operations, classification operations, segmentation operations, and the like. As such, the computing system of a vehicle, for example, may be able to improve its detection, classification, and/or segmentation of objects (e.g., obstacles, vehicles, pedestrians, etc.) and its trajectory and/or route planning, e.g., to control movement of the vehicle to avoid colliding with obstacles. For example, determining whether an object corresponds to another object (e.g., the two objects are the same object) or whether the object corresponds to a bounding box of the object may affect how the vehicle is controlled. These and other improvements to the functioning of the computing system are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform, manually driven vehicles, etc.), and is not limited to autonomous vehicles. In another example, the techniques can be utilized in an aviation or nautical context, in any system using machine vision, or in any network using convolutions. Additionally, the techniques described herein can be used with real data (e.g., captured using sensor(s)), simulated data (e.g., generated by a simulator), or any combination of the two. Furthermore, the techniques described herein may utilize various other sensor data (e.g., lidar data, radar data, time-of-flight data, and/or depth image data, etc.)

FIG. 1 illustrates an example environment that includes a vehicle 102 having a neural network that identifies and/or matches objects based on time-based deformable convolutions, as described herein. Though depicted as a separate network for illustrative purposes in FIG. 1, it is understood that such a network may form a subnetwork of a larger network trained to output identification information, classification information, segmentation information, and the like. In some examples, the environment 100 may include one or multiple features, components, and/or functionality of embodiments described herein with reference to FIGS. 2-8.

In some examples, vehicle 102 may be configured to travel across a surface 104 (e.g., a road surface), for example, to transport people and/or cargo from a first location to a second location. For the purpose of illustration, vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assistance during certain driving conditions, such as, for example, while operating on limited-access highways, but such that they require driver attention and/or assistance during other driving conditions, such as, for example, while operating on city streets in urban areas, or during at least some parking functions.

In some examples, vehicle 102 may be an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. Vehicle 102 may be powered by one or more internal combustion engines, one or more electric motors, hydrogen power, or any combination thereof. In addition, although the example vehicle 102 may have four wheels, the systems and methods described herein may be incorporated into vehicles having fewer or a greater number of wheels, tires, and/or tracks. Vehicle 102 may have four-wheel steering and may operate generally with equal performance characteristics in all directions, for example, such that a first end of vehicle 102 may be in the front end of vehicle 102 when traveling in a first direction, and such that the first end may become the rear end of vehicle 102 when traveling in an opposite, second direction. Similarly, a second end of vehicle 102 may be the front end of vehicle 102 when traveling in the second direction, and the second end may become the rear end of vehicle 102 when traveling in the opposite, first direction. These example characteristics may facilitate greater maneuverability, for example, in small spaces or crowded environments, such as parking lots and urban areas.

According to various embodiments, the vehicle 102 may include a sensor system 106. Furthermore, in various examples, vehicle 102 may include a vehicle computing system 108. The vehicle computing system 108 may include one or more components that cause the vehicle computing system 108 and/or the vehicle 102 to perform various operations. In various embodiments, the vehicle computing system 108 may include image data 110 (e.g., real-time data and/or data stored in a memory device of the system), a neural network 112, kernel deformation component(s) 114 (e.g., determined by the neural network 112), and/or object detection, classification, and/or segmentation component(s) 116. Image data 110 may include one or more images, such as 118 and 120 that include one or more objects 122. In some examples, vehicle computing system 108 may detect object 122 in image 120 (and/or image 118) and generate as output a feature map based on a temporal-based deformable kernel. In some implementations, vehicle computing system 108 may crop the image, e.g., substantially along a bounding box, based on a pixelwise instance, to produce an image patch that represents the detected object. A portion of the feature map may be associated with the bounding box and an instance segmentation, which is a pixel level segmentation of the object in the image.

In some examples, sensor system 106 (e.g., via an image sensor or camera) of vehicle 102 may capture one or more images of a scene. In a non-limiting example, a camera of sensor system 106 may capture images of a scene that includes one or more objects, such as pedestrian 124. As depicted in FIG. 1, pedestrian 124 is at a first position at a time T-t, and is at a second position at time T (e.g., a span of time t after time T-t). Thus, pedestrian 124 moves during this time span from the first to the second position. Alternatively, pedestrian 124 may be stationary while the camera moves with respect to pedestrian 124. In either case, pedestrian 124 is associated with an apparent motion so that pedestrian 124 is in a different location in successive images that include pedestrian 124. In some implementations, vehicle computing system 108 may attempt to track, detect, classify, and/or segment pedestrian 124 based at least in part on the images captured by sensor system 106. Such a situation, involving motion of an object, presents a relatively difficult task of identifying or distinguishing the pedestrian from remaining portions of the image(s), as described below. For example, vehicle computing system 108 may use a process based on a feature map of an image captured earlier (e.g., time T-t), or the previously captured image itself, and a current feature map (e.g., based on an image captured at time T), or the currently captured image itself, to generate an offset field (which may be determined on a per pixel location basis) used to deform a kernel in a deformable convolution, which can be used to track, detect, classify, and/or segment pedestrian 124 at both locations (e.g., both times) as being the same pedestrian.

According to some embodiments, kernel deformation component(s) 114 may use image data 110 as inputs to neural network 112, which may be trained to learn kernel shapes that can be used in a process of deformable convolution to generate feature maps. Accordingly, neural network 112 may determine an offset field to be applied to a regular kernel. In some non-limiting examples, neural network 112 may be trained to learn kernel shapes associated with multiple classes of objects (e.g., vehicles, bicycles, pedestrians, and/or drivable surfaces, etc.). According to implementations, image data 110 and a feature map from an earlier time may be used as input to neural network 112, which may determine an associated offset field. Such determining may be based on a loss associated with optical flow between pixels of one image and corresponding pixels of a subsequent image. Alternatively, or additionally, the loss may be associated with a tracking of one or more bounding boxes of objects from one image to a subsequent image. In at least some examples, where tracking information is available, tracking information may be used to determine deformations to kernels. Otherwise in such examples, optical flow information may be used. For example, neural network 112 may learn, based on an auxiliary loss, what the offset field (and thus the deformation of a kernel) should be given either optical flow between images and/or tracking of bounding boxes between images. In either case, optical flow information may only be used for training the kernel deformation component 114, as training such a component may cause the component to learn optical flow. The offset field may be in the form of individual vectors for elements of a regular kernel (e.g., a 3×3 kernel). Such a vector may indicate the offset or displacement of a particular element of the regular kernel.

According to some embodiments, object detection, classification, and/or segmentation component(s) 116 may determine, based at least in part on image embeddings output from neural network 112, an identity of one or more objects (e.g., a unique identifier for a particular object). Additionally, or alternatively, object detection, classification, and/or segmentation component(s) 116 may determine, based at least in part on image embeddings output from neural network 112, whether an object matches another object.

In some embodiments, sensor system 106 may include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. Sensor system 106 can generate sensor data, which can be utilized by vehicle computing system 108 associated with vehicle 102.

Figure 2:
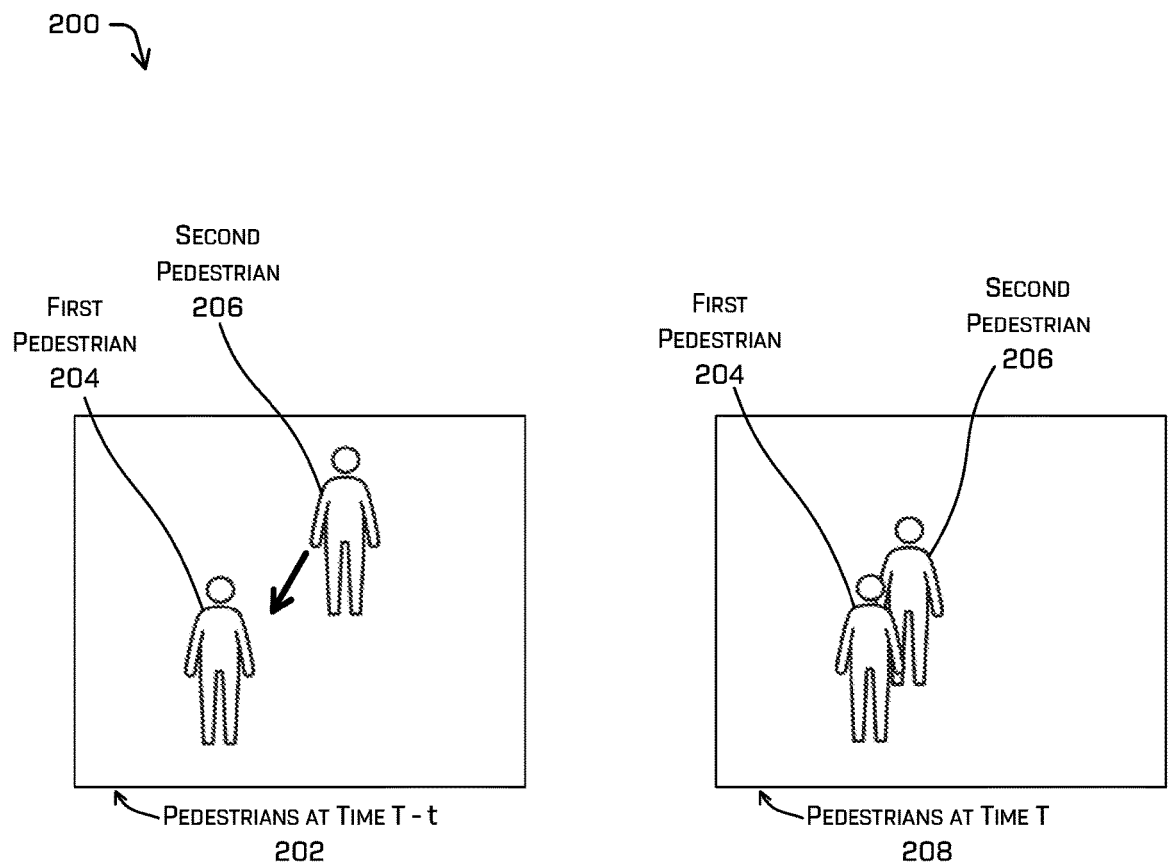
FIG. 2 is a schematic diagram illustrating object motion as perceived by a camera of a vehicle and as analyzed by a neural network that operates with time-based deformable convolutions, as described herein.

FIG. 2 is a schematic diagram illustrating an example 200 of object motion as perceived by a camera of sensor system 106 of vehicle 102 and as analyzed by neural network 112 that operates with time-based deformable convolutions, as described herein. At time T-t, the camera captures an image 202 of a first pedestrian 204 and a second pedestrian 206. At time T, the camera captures an image 208 of first pedestrian 204 and second pedestrian 206 having relative positions different from those of image 202. For example, and as depicted in FIG. 2, first pedestrian 204 and second pedestrian 206 are visually separated in image 202 whereas first pedestrian 204 partially occludes (e.g., with respect to the position of the camera) second pedestrian 206 in image 208. This difference in relative positions in the two images may be caused by the camera changing location relative to one or both pedestrians or may be caused by one or both pedestrians changing their location (or a combination of the camera and one or both pedestrians moving). In either case, an apparent motion of second pedestrian 206 leads to the situation where first pedestrian 204 partially occludes second pedestrian 206 in image 208.

As described in detail below, vehicle computing system 108 may identify pedestrians 204 and 206 in image 208 by using kernels that are deformed based, at least in part, on a feature map of image content of earlier image 202. In this fashion, generally speaking, information from an earlier time is gleaned (e.g., by a convolution kernel deformed based on the earlier time) to help vehicle computing system 108 consider apparent motion in a process of identifying the pedestrians.

Figure 3:
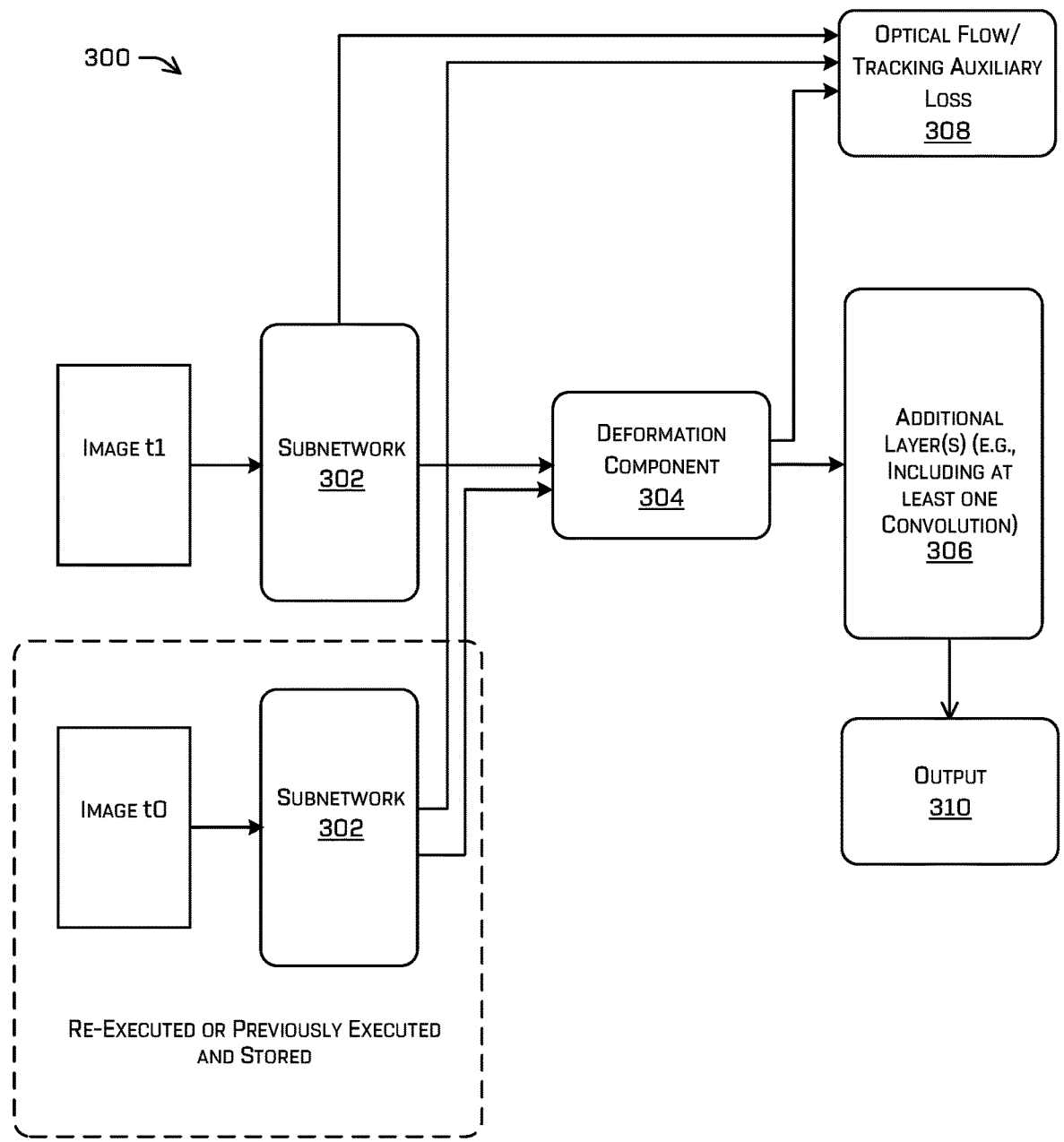
FIG. 3 is a schematic diagram illustrating an example system for determining and applying temporal-based deformed kernels to images or feature maps, as described herein.

FIG. 3 is a schematic diagram illustrating data flow in an example system 300 for applying temporal-based deformed kernels to images or feature maps, as described herein. An image to captured at a time to may be provided to a subnetwork 302 (which may comprise a portion of a larger neural network and/or a separate neural network). At a later time, an image t1 captured at a time t1 may be provided to the subnetwork 302. As indicated by the dashed line surrounding image t0 and subnetwork 302, the image t0 and/or subsequent output of subnetwork 302 (which may comprise a feature map) may either be re-executed at time t1 and/or previously executed and stored. Of course, though depicted in FIG. 3 as images for illustrative purposes, any other modality is contemplated (e.g., LIDAR point clouds, radar returns, time of flight data, depth map data, etc.).

Generally, subnetwork 302 is a portion of system 300 that may produce a feature map from an image and is located in system 300 before a convolution process, for example. Subnetwork 302 may operate directly on images and may include any number of layers, whereby an output of a first layer is an input for a second layer. Output from subnetwork 302 (for both times to and t1) may be provided to a deformation component 304, which is a network portion of system 300. In some examples, the subnetwork 302 may be omitted such that the image t1 and the image t2 are provided to the deformation component for determining an offset field, and accordingly, a deformable kernel. In such examples, images t0 and t1 may be directly input into the deformation component 304. In such examples, system 300 may not comprise subnetworks 302.

Deformation component 304 may be trained to output a deformation of a kernel on a per-pixel basis that is to be applied, via a convolution process, to a previous layer. In other words, a deformed kernel, determined by deformation component 304 (as described below), may be applied during a convolution to a previous layer output from subnetwork 302. In particular, deformation component 304 may generate an offset field that can be used to generate a deformed kernel to be applied in a convolution in one or more additional layer(s) 306. In some cases, the one or more additional layer(s) 306 may perform at least one convolution using a deformed kernel based at least in part on the output of the deformation component 304. As a non-limiting example, a convolution process may comprise performing a matrix multiplication (on a per-pixel basis) with the deformed kernel and a portion of data over which the deformed kernel is centered and taking a sum of such a product. In turn, one or more additional layers (e.g., feature maps) 306 may result from the convolution with the deformed kernel.

In various implementations, deformation component 304 may be trained to determine kernel deformations using an optical flow or tracking loss (e.g., auxiliary loss), as in box 308. For example, the output of subnetwork 302 for image to and the output of subnetwork 302 for image t1 may be used on a per-pixel basis to calculate the optical flow (e.g., an optical flow directly between the two images or an optical flow between two feature maps corresponding respectively to the two images). This optical flow can be used as a ground truth to determine a loss (e.g., an L2 loss) associated with an offset field (and accordingly, a deformed kernel). That is, the system can use the optical flow associated with an image t1 and an image t0 (and/or optical flow associated with corresponding output feature maps from subnetworks 302) as ground truth when training the deformation component to output an offset field/deformed kernel for subsequent convolution(s). In some cases, the optical flow can represent a dense vector field mapping pixels from the t0 image to the t1 image. In some cases, the optical flow can be downsampled to match a ratio associated with an output of subnetwork 302 (e.g., in those examples where convolutions and/or downsampling of subsystem 302 result in an output size smaller than that of the images t0 and t1). Once trained, however, optical flow need not be calculated by system 300 and may be determined by deformation component 304.

As an alternative, if the two images include an object, then tracking information of the object may be used instead of or in addition to the optical flow. Though not pictured here, tracking information may be provided by an additional system as input to deformation component 304 and/or otherwise comprise a learned feature of deformation component 304. In any such example, tracking information may comprise, for example, a pixel coordinate of a center of a bounding box in an image associated with the object, extents of the bounding box, and/or corresponding pixel velocities of the box.

In either example, such a loss may comprise sum of a difference of vectors of the offset field and one or more of the optical flow or the tracking velocity. As a non-limiting example, as an object moves to the right, both optical flow and tracking should indicate a vector pointing to the right per pixel associated with the object. In such an example, vector offsets of the kernel deformation output by a sufficiently trained deformation component 304 should generally correspond to either one or more of the optical flow and/or tracking velocity. Of course, though such box 308 is used for training purposes, data may not flow to box 308 during inference.

Output 310 from system 300 may comprise detection, tracking, or segmentation of an object or a bounding box for the object, and so on.

Though two images (image t1 and image t2) are considered in this example, any number of images or layers that correspond to different times may be used by system 300. For example, an image sensor of a vehicle may capture images at 30 Hz (30 frames per second). In some examples, every N-th frame (e.g., 1, 2, 3, 10, and the like) can be selected and input to the subnetwork 302 for the purposes of generating a deformed kernel, as discussed herein.

Figure 4:
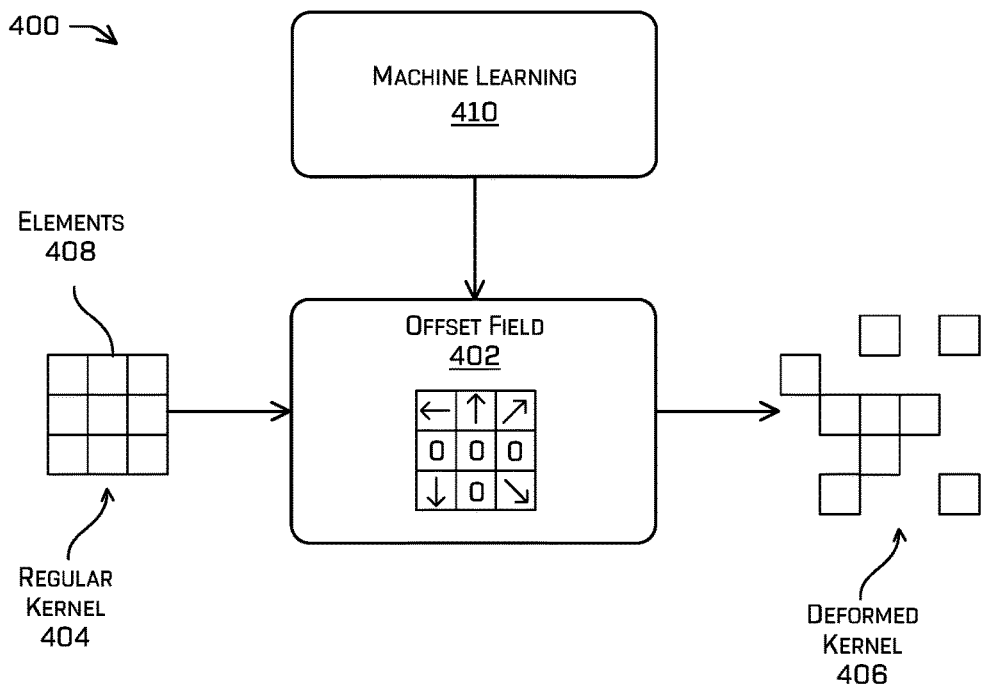
FIG. 4 is a schematic diagram illustrating a process of applying an offset field to a regular kernel to generate a deformed kernel, according to some embodiments.

FIG. 4 is a schematic diagram illustrating an example process 400 of applying an offset field 402 to a regular kernel 404 to generate deformed kernel 406, according to some embodiments. As depicted in the particular example, of FIG. 4, regular kernel 404 is a 3×3 matrix of elements 408, which are configured in a square (which is a special case of a rectangle). Offset field 402 is applied to elements 408 of regular kernel 404 to displace, by a distance of one or more pixels or activations, the individual elements 408 in a horizontal, vertical, or diagonal direction. The direction and integral distance may be represented by a vector, for example. Offset field 402 may also include a null vector (e.g., "0") that indicates no offset for a particular element. As explained above, neural network 112 may use a process of machine learning 410 to determine offset field 402.

Figure 5:
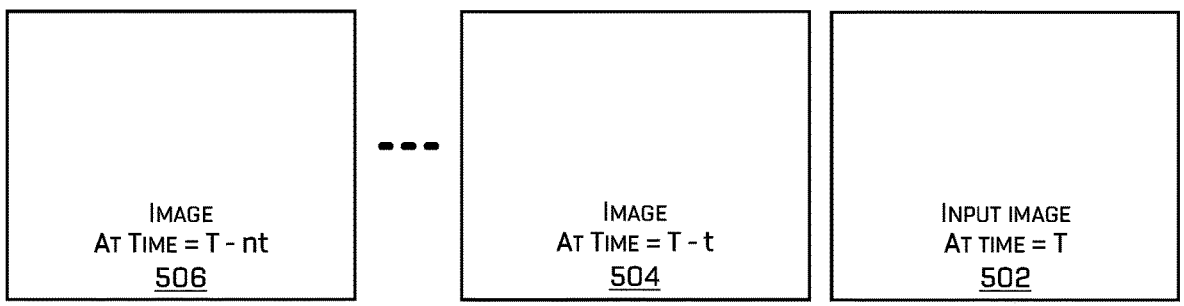
FIG. 5 is a schematic diagram illustrating a time sequence of feature maps, some of which may be used to determine offsets to a regular kernel to generate a deformed kernel, according to some embodiments.

FIG. 5 is a schematic diagram illustrating a time sequence 500 of images, some of which may be used to determine an offset field 402 for regular kernel 404 to generate deformed kernel 406, according to some embodiments. Sequence 500 of the images may include a fairly large number of images that represent a sequence of images or a video that extends over a time span. Alternatively, instead of images, time sequence 500 may include feature maps (e.g., that in turn may represent a sequence of images or video) or other data. Sequence 500 includes input image 502, which corresponds to an image captured at a time T (or corresponds to a feature map that in turn corresponds to the image captured at time T, and so on). Sequence 500 also includes image 504, which corresponds to an image captured at a time T-1 (or corresponds to a feature map that in turn corresponds to the image captured at time T-1, and so on). Sequence 500 additionally includes input images 506, which correspond to a sequence of images captured at a times T-nt, where n is an integer greater than 1 and t may be an inverse of the frequency at which the sequence of images is captured (e.g., the period of image capture).

Referring to FIGS. 3 and 4, neural network 112 may apply deformed kernel 406 to input image 502 to produce an output feature map. Deformed kernel 406 may be adapted to image content of the image captured at time T. In other words, a configuration or shape of deformed kernel 406 may at least partially correspond to a shape of an object on the image captured at time T. Neural network 112 may generate offset field 402, via machine learning, using an image corresponding to an earlier time, such as time T-t or any of times T-nt. Thus, for example, neural network 112 may generate offset field 402 using image 504 or any of images 506. In some implementations, neural network 112 may generate offset field 402, via machine learning, using more than one image corresponding to one or more earlier times, such as time T-t and/or any of times T-nt.

Figure 6:
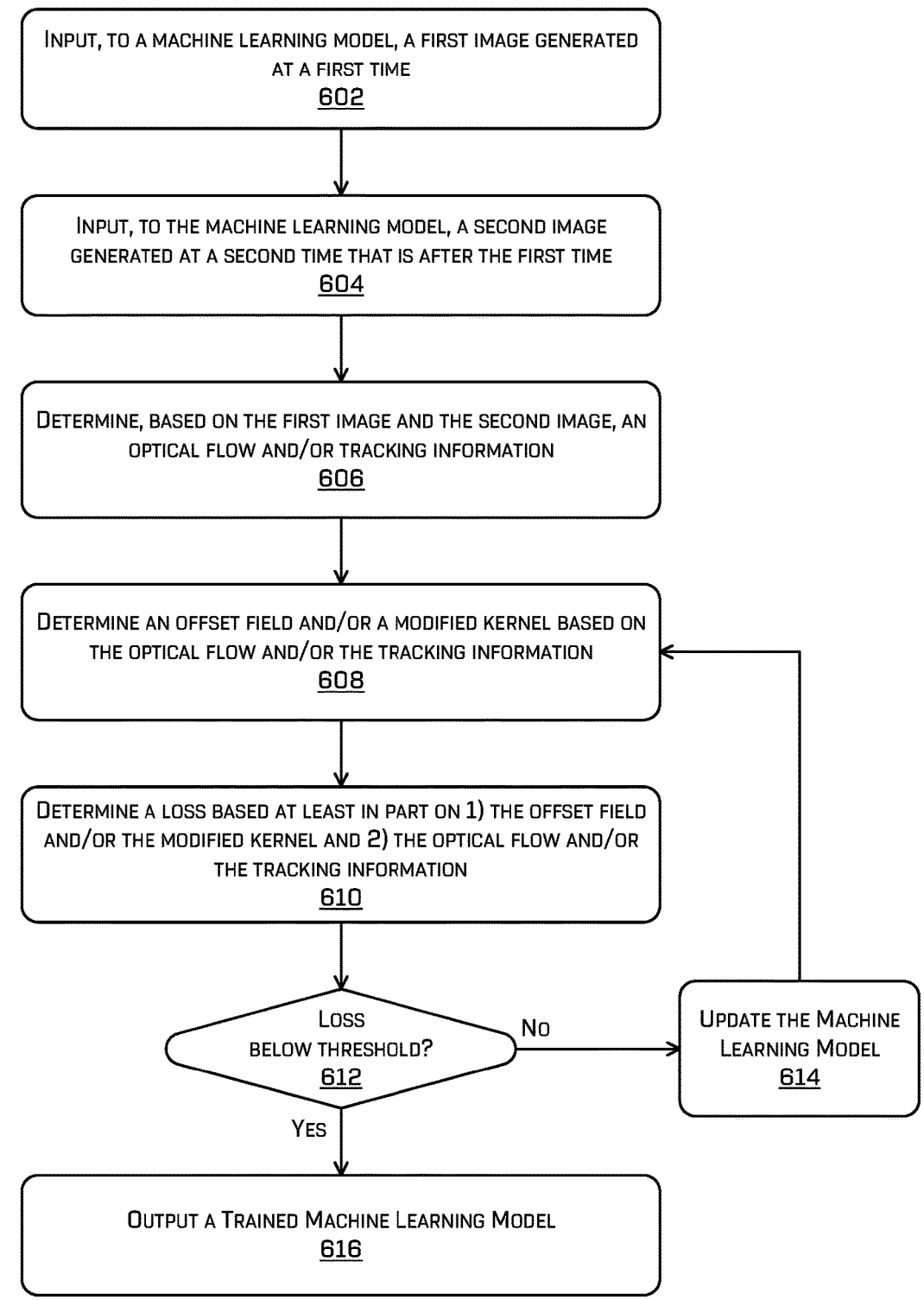
FIG. 6 is a flow diagram illustrating an example process for training a neural network to learn offsets for generating deformed kernels, as described herein.

FIG. 6 is a flow diagram illustrating an example process 600 for training a neural network to learn offsets for generating deformed kernels, as described herein. For example, the neural network may be trained to learn shapes of deformed kernels. In some implementations, a machine learning model may be trained to output multiple output regions of interest corresponding to classifications based, at least in part, on an image. Such classifications may comprise one or more of a vehicle, a pedestrian, or a bicyclist. In some examples, process 600 may include one or multiple features, components, and/or functionality of embodiments described herein with reference to FIGS. 1-5 and 8. For instance, process 600 may be performed by computing device(s) 840, as discussed herein.

At 602, the process can include inputting, to a machine learning model, a first image generated at a first time. For example, the first image may be retrieved from a memory device that has been stored the first image since it was generated. At 604, the process can include inputting, to a machine learning model, a second image generated at a second time that is after the first time. In some implementations, the object has moved with respect to the camera that has captured the images. Such movement may be between a time associated with the capturing of the first image and a time associated with the capturing of the second image.

At 606, the process can include determining, based on the first image and the second image, an optical flow and/or tracking information. In some examples, the operation 606 can determine an optical flow associated with individual pixels of the images. In some instances, tracking information can comprise image embeddings (e.g., multi-dimensional vectors associated with pixels of an image uniquely identifying object(s) in the image), bounding boxes, bounding box centers, bounding box extents (e.g., lengths and widths in pixels), object velocities in pixels (e.g., a change in pixels in both a "u" and "v" direction), and the like.

At 608, the process can include determining an offset field and/or a modified kernel based on the optical flow and/or the tracking information. For example, the offset field can include vector(s) associated with shift(s) to deform a kernel to generate a modified kernel.

At 610, the process can include determining a loss based at least in part on 1) the offset field and/or the modified kernel and 2) the optical flow and/or the tracking information. For example, and in some instances, the optical flow and/or the tracking information can be used as a ground truth to evaluate an accuracy and/or precision of the offset field and/or the modified kernel. In such cases, the loss may be based at least in part on one or more of a difference between an average offset vector for the kernel and a vector associated with the optical flow and/or tracking velocity. In at least some examples, where tracking information is available (e.g., where it is provided as ground truth and/or otherwise calculated by another, previously trained network and/or algorithm) the tracking information may be preferred over the optical flow.

At 612, the process can include determining whether the loss is below a threshold. In some examples, the process can include determining if a magnitude of a loss is below a threshold. In some examples, the process can include determining if a difference between a first loss and a second loss (e.g., evaluated with respect to iterations of the process 600) is below a threshold. In some instances, the process can include determining whether a number of iterations of the process 600 has been performed. If the loss is not below a threshold ("no" in operation 612) the process can continue to 614, where the loss can be back propagated throughout the machine learning model to update the machine learning model. In some examples, the operation 614 can include varying weight(s) of one or more parameters of various layers of the machine learning model to generate an updated model. Subsequently, the process can return to operation 608 to generate updated offset fields and/or updated modified kernels to evaluate an updated loss.

If the loss is below a threshold ("yes" in operation 612), the process can continue to the operation 616 to output a trained machine learning model. In some examples, the trained machine learning model can be output to a system (such as a vehicle or an autonomous vehicle) to perform operations such as, but not limited to, detection, classification, segmentation, and the like.

Figure 7:
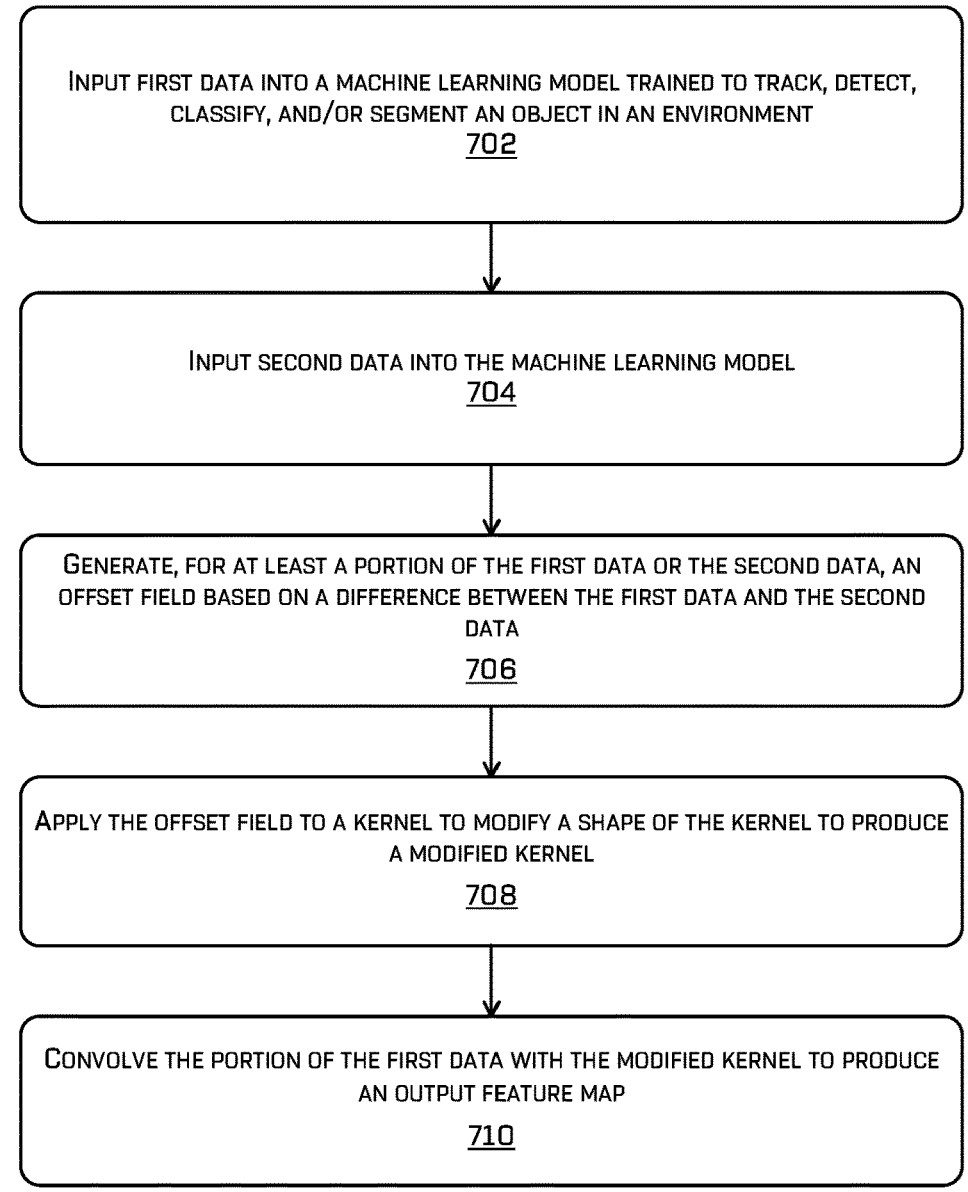
FIG. 7 is a flow diagram illustrating an example process for implementing a neural network that determines feature maps based on time-based deformable convolutions, as described herein.

FIG. 7 is a flow chart illustrating an example process for implementing a neural network that determines feature maps based on time-based deformable convolutions, as described herein. For example, the neural network may be trained by a process the same as or similar to process 600 to learn shapes of deformed kernels. In some examples, process 700 may include one or multiple features, components, and/or functionality of embodiments described herein with reference to FIGS. 1-5 and 8. For instance, process 700 may be performed by vehicle computing system 108.

At 702, process 700 may begin by inputting first data into a machine learning model trained to track, detect, classify, and/or segment an object. First data, for example, may be an image or a feature map. The machine learning model may be trained to output a tracking, detection, classification, or segmentation of an object in an environment by performing process 700.

At 704, vehicle computing system 108 may receive second data into the machine learning model. Second data may be an image or a feature map. For example, second data may be an image captured at a first time and second data may be an image captured at a later time. Alternatively, second data may be a feature map based on an image captured at a first time and second data may be an image captured at a later time. In yet another alternative, second data may be a feature map based on an image captured at a first time and second data may be a feature map based on an image captured at a later time.

At 706, vehicle computing system 108 may generate, for at least a portion of the first data or the second data, an offset field based on a difference between the first data and the second data.

At 708, vehicle computing system 108 may apply the offset field to a kernel to modify a shape of the kernel to produce a modified kernel.

At 710, vehicle computing system 108 may convolve the portion of the first data with the modified kernel to produce an output feature map. The output feature map may subsequently be applied in an iteration (e.g., a repeat) of process 700 as the second data of 704. This and subsequent feature maps may be used to track, detect, classify, or segment the object, for example.

Further, the process 700 can include controlling a vehicle or an autonomous vehicle based at least in part on the output of a machine learning model. For example, the machine learning model can output one or more of tracking information, detection information, classification information, and/or segmentation information. The vehicle computing device 108 can generate a trajectory for the vehicle to follow, based at least in part on the output of the machine learning model, as discussed herein.

Figure 8:
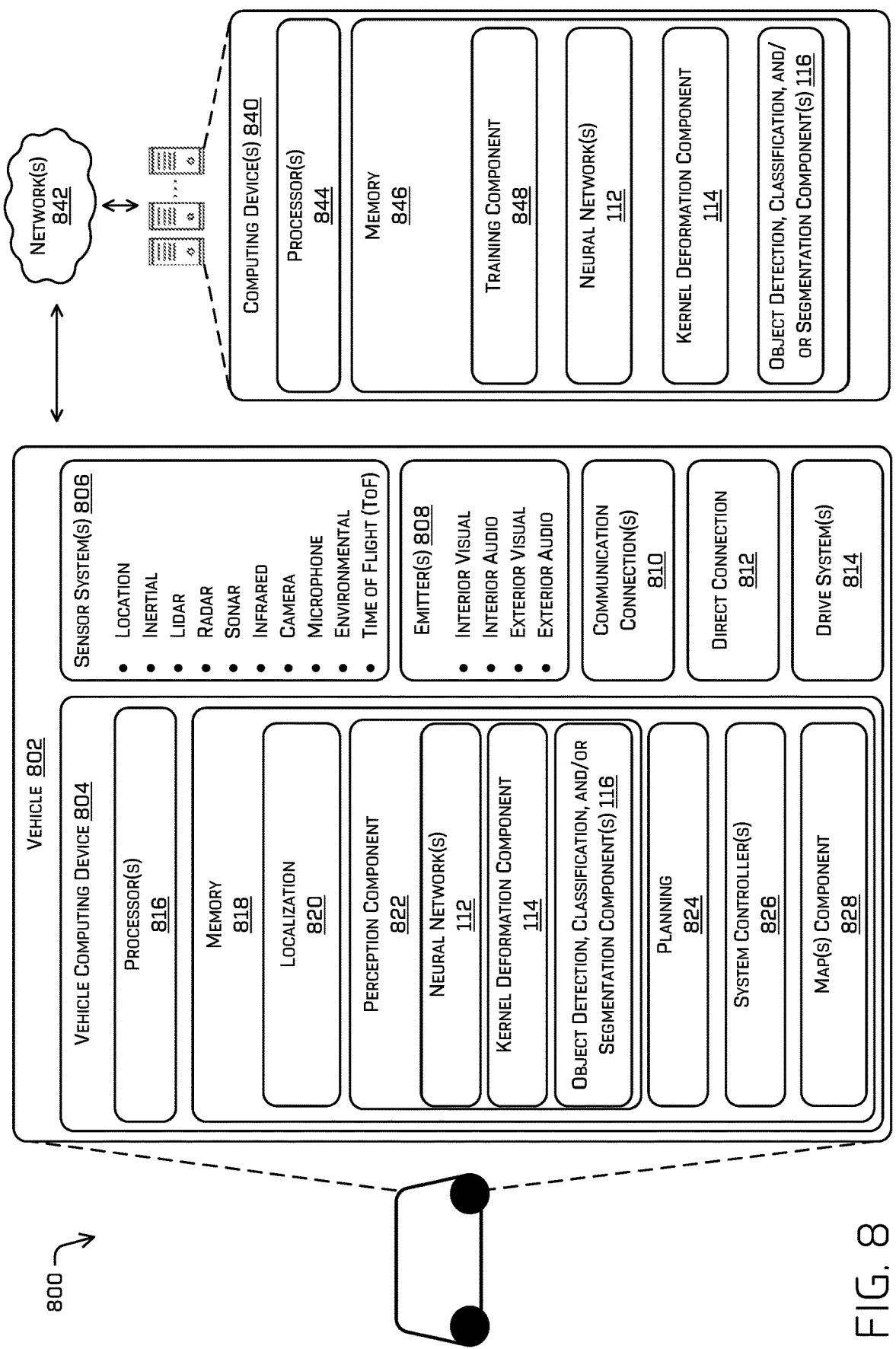
FIG. 8 is a block diagram of an example system for implementing the techniques described herein, as described herein.

FIG. 8 is a block diagram of an example system 800 for implementing the techniques described herein, in accordance with embodiments of the disclosure. In some examples, the system 800 may include one or multiple features, components, and/or functionality of embodiments described herein with reference to FIGS. 1-7.

In some embodiments, the system 800 may include a vehicle 802 (e.g., the vehicle 102 described herein with reference to FIG. 1). The vehicle 802 may include a vehicle computing device 804, one or more sensor systems 806, one or more emitters 808, one or more communication connections 810, at least one direct connection 812, and one or more drive systems 814.

The vehicle computing device 804 can include one or more processors 816 and memory 818 communicatively coupled with the one or more processors 816. In the illustrated example, the vehicle 802 is an autonomous vehicle; however, the vehicle 802 could be any other type of vehicle, or any other system having at least an image capture device (e.g., a camera enabled smartphone). In the illustrated example, the memory 818 of the vehicle computing device 804 stores a localization component 820, a perception component 822, a planning component 824, one or more system controllers 826, a map(s) component 828, neural network(s) 112, kernel deformation component(s) 114, and/or object detection, classification, and/or segmentation component(s) 116. Perception component 822 may include neural network(s) 112, kernel deformation component(s) 114, and/or object detection, classification, and/or segmentation component(s) 116. Though depicted in FIG. 8 as residing in memory 818 for illustrative purposes, it is contemplated that localization component 820, perception component 822, planning component 824, one or more system controllers 826, neural network(s) 112, kernel deformation component(s) 114, and/or object detection, classification, and/or segmentation component(s) 116 can additionally, or alternatively, be accessible to the vehicle 802 (e.g., stored on, or otherwise accessible by, memory remote from the vehicle 802). In some instances, the vehicle computing device(s) 804 can correspond to the vehicle computing system 108 of FIG. 1.

In at least one example, the localization component 820 can include functionality to receive data from the sensor system(s) 806 to determine a position and/or orientation of the vehicle 802 (e.g., one or more of an x-, y-, z-position, roll, pitch, or yaw). For example, the localization component 820 can include and/or request/receive a map of an environment and can continuously determine a location and/or orientation of the autonomous vehicle within the map. In some instances, the localization component 820 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 820 can provide data to various components of the vehicle 802 to determine an initial position of an autonomous vehicle for generating a trajectory and/or for determining to retrieve map data including an occlusion grid from memory, as discussed herein.

In some instances, the perception component 822 can include functionality to perform object tracking, detection, segmentation, and/or classification (e.g., based on the techniques discussed herein). In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, unknown, etc.). In additional and/or alternative examples, the perception component 822 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 824 can determine a path for the vehicle 802 to follow to traverse through an environment. For example, the planning component 824 can determine various routes and trajectories and various levels of detail. For example, the planning component 824 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 824 can generate an instruction for guiding the autonomous vehicle along at least a portion of the route from the first location to the second location. In at least one example, the planning component 824 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 802 to navigate.

In at least one example, the vehicle computing device 804 can include one or more system controllers 826, which can be configured to control steering, propulsion, braking, safety, emitters, communication, and other systems of the vehicle 802. These system controller(s) 826 can communicate with and/or control corresponding systems of the drive system(s) 814 and/or other components of the vehicle 802.

The memory 818 can further include one or more maps (not shown) that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 802 can be controlled based at least in part on the maps. That is, the maps can be used in connection with the localization component 820, the perception component 822, and/or the planning component 824 to determine a location of the vehicle 802, identify objects in an environment, and/or generate routes and/or trajectories to navigate within an environment.

In some examples, the one or more maps can be stored on a remote computing device(s) (such as the computing device(s) 840) accessible via network(s) 842. In some examples, multiple maps can be stored based on, for example, a characteristic (e.g., type of entity, time of day, day of week, season of the year, etc.). Storing multiple maps can have similar memory requirements but increase the speed at which data in a map can be accessed.

In some instances, aspects of some or all of the components discussed herein can include any models, algorithms, and/or machine learning algorithms. For example, in some instances, the components in the memory 818 (and the memory 846, discussed below) can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 806 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), an one or more time of flight (ToF) sensors, etc. The sensor system(s) 806 can include multiple instances of each of these or other types of sensors. For instance, the lidar sensors can include individual lidar sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the vehicle computing device 804. Additionally, or alternatively, the sensor system(s) 806 can send sensor data, via the one or more networks 842, to the one or more computing device(s) at a particular frequency, after a lapse of a predetermined period of time, in near real-time, etc. In some instances, the sensor system(s) 806 can correspond to the sensor(s) 106 of FIG. 1.

The vehicle 802 can also include one or more emitters 808 for emitting light and/or sound, as described above. The emitters 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 can also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device 804 to another computing device or a network, such as network(s) 842. For example, the communications connection(s) 810 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 can include one or more drive systems 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include one or more sensor systems to detect conditions of the drive system(s) 814 and/or the surroundings of the vehicle 802. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 814. In some cases, the sensor system(s) on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 814. Furthermore, the drive system(s) 814 also include one or more communication connection(s) that enable communication by the respective drive system with one or more other local or remote computing device(s).

In at least one example, the direct connection 812 can provide a physical interface to couple the one or more drive system(s) 814 with the body of the vehicle 802. For example, the direct connection 812 can allow the transfer of energy, fluids, air, data, etc. between the drive system(s) 814 and the vehicle. In some instances, the direct connection 812 can further releasably secure the drive system(s) 814 to the body of the vehicle 802.

In at least one example, the components discussed herein can process sensor data, as described above, and can send their respective outputs, over the one or more network(s) 842, to one or more computing device(s) 840. In at least one example, the components discussed herein can send their respective outputs to the one or more computing device(s) 840 at a particular frequency, after a lapse of a predetermined period of time, in near real-time, etc.

In some examples, the vehicle 802 can send sensor data to one or more computing device(s) 840 via the network(s) 842. In some examples, the vehicle 802 can send raw sensor data to the computing device(s) 840. In other examples, the vehicle 802 can send processed sensor data and/or representations of sensor data to the computing device(s) 840. In some examples, the vehicle 802 can send sensor data to the computing device(s) 840 at a particular frequency, after a lapse of a predetermined period of time, in near real-time, etc. In some cases, the vehicle 802 can send sensor data (raw or processed) to the computing device(s) 840 as one or more log files.

The computing device(s) 840 can include processor(s) 844 and a memory 846 storing a training component 848, neural network(s) 112, a kernel deformation component(s) 114, and/or object detection, classification, and/or segmentation component(s) 116.

The processor(s) 816 of the vehicle 802 and the processor(s) 844 of the computing device(s) 840 can be any suitable processor capable of executing instructions to process data and perform operations as described herein. By way of example and not limitation, the processor(s) 816 and 844 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 846 are examples of non-transitory computer-readable media. The memory 818 and 846 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 8 is illustrated as a distributed system, in alternative examples, components of the vehicle 802 can be associated with the computing device(s) 840 and/or components of the computing device(s) 840 can be associated with the vehicle 802. That is, the vehicle 802 can perform one or more of the functions associated with the computing device(s) 840, and vice versa. Further, aspects of neural network(s) 112, kernel deformation component(s) 114, and/or object detection, classification, and/or segmentation component(s) 116 can be performed on any of the devices discussed herein.

Example Clauses

A. A system comprising: one or more processors; and one or more computer-readable media storing instructions executable by the one or more processors, wherein the instructions, when executed, cause the system to perform operations comprising: training a machine learned (ML) model to detect an object in an environment, the training comprising: inputting a first image generated at a first time; inputting a second image generated at a second time different from the first time; determining, based at least in part on the first image and the second image, an optical flow; determining, for a portion of the second image, an offset field based at least in part on a difference between the first image and the second image; based on the offset field, modifying a kernel to produce a modified kernel, the modified kernel associated with a pixel of the first image or the second image; determining an auxiliary loss based at least in part on the modified kernel and the optical flow; updating the ML model based at least in part on the auxiliary loss to generate an updated ML model; and convolving the second image with the modified kernel to produce an output; and transmitting the updated ML model to an autonomous vehicle, wherein detecting the object comprises outputting, by the updated ML model, one or more of a bounding box or an instance segmentation.

B. The system of paragraph A, wherein the difference between the first image and the second image is based at least in part on the optical flow between the first image and the second image.

C. The system of paragraph A, the training further comprising: downsampling the optical flow to determine a downsampled optical flow, wherein the auxiliary loss is based at least in part on the downsampled optical flow.

D. The system of paragraph A, wherein the difference between the first image and the second image is based at least in part on tracking information of the object represented in the first and second images, the tracking information comprising a pixel velocity.

E. The system of paragraph A, wherein the difference between the first image and the second image comprises an optical flow of a first feature map associated with the first image and output by a subnetwork and a second feature map associated with the second image and output by the subnetwork.

F. The system as paragraph E, wherein the first feature map is determined at a first time and stored in the memory and the second feature map is determined at a second time, after the first time.

G. The system of paragraph A, the training further comprising: generating a loss associated with tracking a bounding box corresponding to the object between the first time and the second time, wherein generating the updated ML model is further based at least in part on the loss.

H. The system of paragraph A, wherein a shape of the modified kernel is partially based on a shape of the object or the bounding box.

I. A computer-implemented method comprising: inputting first data into a machine learning model trained to one or more of track an object, detect the object, classify the object, or segment data associated with the object in an environment by performing operations comprising: inputting second data into the machine learning model; generating, for at least a portion of the first data, an offset field based on a difference between the first data and the second data; applying the offset field to a kernel to modify a shape of the kernel to produce a modified kernel; and convolving the portion of the first data with the modified kernel to produce an output feature map.

J. The computer-implemented method of paragraph I, the method further comprising controlling an autonomous vehicle based at least in part on the operations.

K. The computer-implemented method of paragraph I, wherein the difference between the first data and the second data is based at least in part on an optical flow associated with the first data and the second data.

L. The computer-implemented method of paragraph I, wherein the difference is based at least in part on a first feature map associated with the first data and a second feature map associated with the second data, wherein the first feature map is output from a subnetwork in response to receiving the first data, and wherein the second feature map is output from the subnetwork in response to receiving the second data.

M. The computer-implemented method of paragraph K, wherein the first data corresponds to a first image generated at a first time and the second data corresponds to a second image generated at a second time that is different from the first time.

N. The computer-implemented method of paragraph I, wherein the first data corresponds to the object at a first location in a first image and the second data corresponds to the object at a second location in a second image, wherein the difference between the first data and the second data is based at least in part on a difference between the first location and the second location.

O. The computer-implemented method of paragraph I, wherein the difference between the first data and the second data is based at least in part on tracking a bounding box associated with the object or an optical flow associated with the first data and the second data.

P. One or more non-transitory computer-readable media storing instructions executable by one or more processors, wherein the instructions, when executed, cause the one or more processors to perform operations comprising: inputting first data into a machine learning model trained to one or more of track an object, detect the object, classify the object, or segment data associated with the object in an environment by performing operations comprising: generating, for at least a portion of the first data, an offset field based on a difference between the first data and second data; applying the offset field to a kernel to modify a shape of the kernel to produce a modified kernel; and convolving the portion of the first data with the modified kernel to produce an output feature map.

Q. The one or more non-transitory computer-readable media of paragraph P, wherein the difference comprises an optical flow computed between a first feature map and a second feature map, wherein the first feature map is output by a subnetwork in response to receiving the first data, wherein the second feature map is output by the subnetwork in response to receiving the second data, wherein the first feature map is computed at a first time and the second feature map is computed at a second time prior to the first time and stored.

R. The one or more non-transitory computer-readable media of paragraph P, wherein the second data and the first data both correspond to the object in a first image and in a second image, wherein the second data corresponds to a first image captured at a first time and the first data corresponds to a second image captured at a second time.

S. The one or more non-transitory computer-readable media of paragraph Q, wherein the difference is based at least in part on an optical flow determined based on the first image and the second image or a velocity of the object from the first image to the second image, and wherein the operations further comprise: controlling an autonomous vehicle based at least in part on detecting the object.

T. The one or more non-transitory computer-readable media of paragraph R, wherein the difference is based at least in part on at least one of i) a first optical flow determined from the first data and the second data, ii) a second optical flow determined from a first feature map associated with the first data and a second feature map associated with the second data, or iii) tracking of a bounding box corresponding to the object and determined from the first data and the second data.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   training a machine learned (ML) model to detect a first object in an environment, the training comprising:
   inputting a first image generated at a first time;
   inputting a second image generated at a second time different from the first time;
   determining, based at least in part on the first image and the second image, a tracking velocity associated with a second object, wherein the second object is represented in the first image and the second image, and an optical flow, wherein the tracking velocity and the optical flow are determined on a per-pixel basis between the first image and the second image;
   determining an offset field based at least in part on the tracking velocity and the optical flow;
   applying the offset field to a kernel to produce a modified kernel,
   wherein the kernel is configured to perform two-dimensional convolution and is characterized by a plurality of kernel elements, and applying the offset field comprises displacing an individual kernel element of the plurality of kernel elements in a horizontal, vertical, or diagonal direction;
   further wherein the modified kernel is associated with a pixel of the first image or a pixel of the second image;
   determining, on a per-pixel basis, an auxiliary loss based at least in part on an average offset vector of the offset field and a vector associated with the tracking velocity;
   determining that the auxiliary loss meets or exceeds a threshold;
   updating, based at least in part on the auxiliary loss meeting or exceeding the threshold, the ML model to generate an updated ML model;
   convolving, on a per-pixel basis, the second image with the modified kernel to produce an output; and
   transmitting the updated ML model to an autonomous vehicle, wherein detecting an object comprises outputting, by the updated ML model, one or more of a bounding box or an instance segmentation.

2. The system as claim 1 recites,
   the training further comprising determining that a number of training iterations has been performed.

3. The system as claim 2 recites,
   the training further comprising determining that a difference between a first auxiliary loss associated with a first training iteration and a second auxiliary loss associated with a second training iteration meets or exceeds a threshold.

4. The system as claim 1 recites, the training further comprising:
   downsampling the optical flow to determine a downsampled optical flow, wherein the auxiliary loss is based at least in part on the downsampled optical flow.

5. The system as claim 1 recites, wherein the tracking velocity associated with the second object represented in the first image and the second image is represented as an image embedding comprising a vertical component and a horizontal component.

6. The system as claim 1 recites, wherein prior to inputting the first image or the second image, one or more of the first image and the second image is retrieved from a memory device wherein it has been stored since it was generated.

7. The system as claim 1 recites, the training further comprising:
   generating a loss associated with tracking a bounding box corresponding to the second object between the first time and the second time, wherein generating the updated ML model is further based at least in part on the loss.

8. The system as claim 1 recites, wherein displacing the individual kernel element of the plurality of kernel elements is partially based on a shape of the second object or a shape of a bounding box.

9. The system of claim 1,
   wherein updating the machine learned model comprises varying weights associated with one or more parameters of the machine learned model.

10. A computer-implemented method comprising:
inputting first data into a machine learning model, the machine learning model trained at least in part by determining an auxiliary loss based at least in part on an average offset vector of an offset field, to one or more of track an object, detect the object, classify the object, or segment data associated with the object in an environment by performing operations comprising:
inputting second data into the machine learning model;
generating, for at least a portion of the first data, the offset field, wherein the offset field is based on a difference between the first data and the second data;
applying the offset field to a kernel;
generating, based on applying the offset field to the kernel, a modified kernel, and
convolving, on a per-pixel basis, the portion of the first data with the modified kernel to produce an output feature map.

11. The computer-implemented method of claim 10, the method further comprising controlling an autonomous vehicle based at least in part on the operations.

12. The computer-implemented method of claim 10, wherein the difference between the first data and the second data is based at least in part on a tracking velocity associated with the object, wherein the object is represented in the first data and the second data.

13. The computer-implemented method of claim 12, wherein the first data corresponds to a first image generated at a first time and the second data corresponds to a second image generated at a second time that is different from the first time.

14. The computer-implemented method of claim 10, wherein the difference is based at least in part on a first feature map associated with the first data and a second feature map associated with the second data,
wherein the first feature map is output from a subnetwork in response to receiving the first data, and
wherein the second feature map is output from the subnetwork in response to receiving the second data.

15. The computer-implemented method of claim 10, wherein the first data corresponds to the object at a first location in a first image and the second data corresponds to the object at a second location in a second image, wherein the difference between the first data and the second data is based at least in part on a difference between the first location and the second location.

16. The computer-implemented method of claim 10, wherein the difference between the first data and the second data is based at least in part on tracking a bounding box associated with the object or an optical flow associated with the first data and the second data.

17. One or more non-transitory computer-readable media storing instructions executable by one or more processors, wherein the instructions, when executed, cause the one or more processors to perform operations comprising:
inputting first data into a machine learning model trained at least in part by determining an auxiliary loss based at least in part on an average offset vector of an offset field, to one or more of track an object, detect the object, classify the object, or segment data associated with the object in an environment by performing operations comprising:
generating, for at least a portion of the first data, the offset field, wherein the offset field is based on a difference between the first data and second data;
applying the offset field to a kernel;
generating, based on applying the offset field to the kernel, a modified kernel; and
convolving, on a per-pixel basis, the portion of the first data with the modified kernel to produce an output feature map.

18. The one or more non-transitory computer-readable media of claim 17, wherein the difference comprises an optical flow computed between a first feature map and a second feature map,
wherein the first feature map is output by a subnetwork in response to receiving the first data,
wherein the second feature map is output by the subnetwork in response to receiving the second data,
wherein the first feature map is computed at a first time and the second feature map is computed at a second time prior to the first time and stored.

19. The one or more non-transitory computer-readable media of claim 17, the operations further comprising:
capturing, at a first time, a first image including the object; and
capturing, at a second time different than the first time, a second image including the object;
wherein the first data and the second data both correspond, respectively, to the object in the first image and in the second image.

20. The one or more non-transitory computer-readable media of claim 19, wherein the difference is based at least in part on an optical flow determined based on the first image and the second image or a velocity of the object from the first image to the second image, and wherein the operations further comprise:
controlling an autonomous vehicle based at least in part on detecting the object.

21. The one or more non-transitory computer-readable media of claim 20, wherein the difference is based at least in part on at least one of i) a first optical flow determined from the first data and the second data, ii) a second optical flow determined from a first feature map associated with the first data and a second feature map associated with the second data, or iii) tracking of a bounding box corresponding to the object and determined from the first data and the second data.

* * * * *